D. H. MILLER.
NUT LOCKING DEVICE.
APPLICATION FILED APR. 17, 1908.
916,351. Patented Mar. 23, 1909.
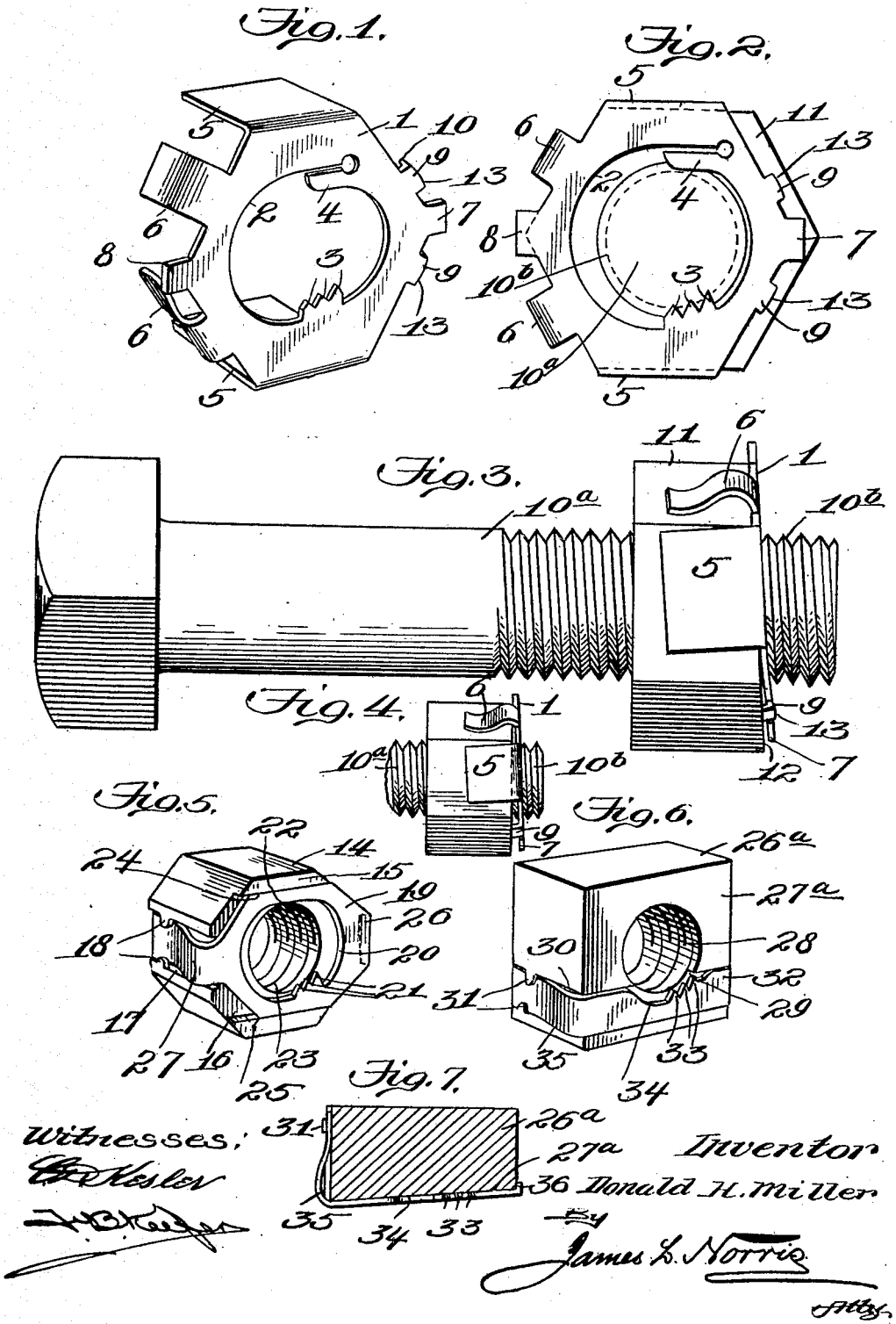

ated to indicate a constructional reduction to practice of the invention, but it will be understood that various modifications in the details of construction as well as in the proportions and dimensions may be adopted without departing from the spirit of the invention.

UNITED STATES PATENT OFFICE.

DONALD H. MILLER, OF BINGHAMTON, NEW YORK.

NUT-LOCKING DEVICE.

No. 916,351.   Specification of Letters Patent.   Patented March 23, 1909.

Application filed April 17, 1908. Serial No. 427,679.

*To all whom it may concern:*

Be it known that I, DONALD H. MILLER, a citizen of the United States, residing at Binghamton, in the county of Broome and State of New York, have invented new and useful Improvements in Nut-Locking Devices, of which the following is a specification.

This invention relates to lock devices for engagement with a bolt nut and embodies automatic locking characteristics and capable of expeditious application and removal.

This lock device is equipped with structural elements to permit it to set up a firm and reliable locking relation to the threads of a bolt and to so engage a nut as to completely obstruct loosening of the said nut, yet facilitating the removal of the nut by quick disengagement of the device.

The improved lock device, together with modifications thereof which will be hereinafter explained, does not in its application require the least preliminary mutilation of the threads of the bolt and all forms of the device which will be hereinafter specified embody the same principle of operation and features of construction which are practically alike or similar.

The invention in its generic sense contemplates the use of a locking device that may be either in the form of a flat plate having an opening therein and cutting teeth exposed for engagement with the threads of a bolt and applicable either to the outer ungrooved face of a nut, or it may be an elongated plate or narrow strip likewise provided with thread engaging teeth and applied to the outer face of the nut, or the nut may be grooved at its outer face and adjacent sides to receive the first mentioned plate or the narrow plate or strip, but whatever may be the form and specific structure of the locking device it has means for engaging the side faces of a nut which may at times straddle the angles between the said side faces, the teeth in all forms having gradual variations in length from a minimum to a maximum dimension and operating by a movement over the face of the nut to establish a self-cutting engagement or an automatic seat forming operation with respect to the bolt threads.

Other features of construction will be mentioned and advantages specified in relation thereto in the subjoined description, and in the drawings forming part of this specification, a few of the several effective forms of embodiment of the invention have been illustrated to indicate a constructional reduction to practice of the invention, but it will be understood that various modifications in the details of construction as well as in the proportions and dimensions may be adopted without departing from the spirit of the invention.

In the drawings: Figure 1 is a perspective view of one form of locking device embodying the features of the invention. Fig. 2 is a face view of a nut and bolt showing the device illustrated by Fig. 1 applied thereto. Fig. 3 is a side view of a bolt and nut showing the device in position on the nut and engaging the bolt. Fig. 4 is a view similar to Fig. 3 showing a nut with a straight face and the position of the device in relation thereto. Fig. 5 is a detail perspective view of a nut showing a modified form of the lock device and nut. Fig. 6 is a detail perspective view of a nut and locking device showing a further modification. Fig. 7 is a horizontal section taken through the nut shown by Fig. 6 and showing the floor of the groove in the nut face as being inclined.

Similar characters of reference are employed to indicate corresponding parts in the several views.

The lock device shown by Figs. 1, 2, 3 and 4 consists of a flat metal plate preferably formed of carbon steel and designated by the numeral 1, the said plate having a contour corresponding to the perimeter of the nut to which it is to be applied, and in the present instance shown as hexagonal. It will be understood, however, that the plate may be of any other peripheral shape, and the general dimensions may also be varied in accordance with the face dimensions of the nut to which it is applied. In the center of the plate 1 an opening 2, approximately elliptical, is formed, and from the lower wall of this opening a plurality of teeth 3 projects inwardly, the number of teeth shown being three and gradually increasing in extent inwardly toward one extremity of the wall of the opening, or from left to right, as shown in the drawing. The teeth 3 project inwardly into the opening 2 in planes at right angles with respect to the portion of the wall of the said opening carrying the same so that said teeth will always be in position to strike into the threads of the bolt over which the locking device may be placed in a plane transverse with relation to the bolt. The upper wall of the opening 2 has a longitudinal tongue 4 extending thereinto and located to one side of the vertical diameter of the opening. At diametrically opposite points the plate 1 is also provided with embracing flanges to engage the side faces of the nut, said flanges being designated by the numeral 5. Between the embracing flanges 5 at one side of the vertical center of the plate 1 are bent spring tongues 6 preferably of the form shown to embrace the faces of the nut between those engaged by the flanges 5 and operating to hold the device drawn to the left or so that it will engage the bolt. The purpose of the tongues 6 is to set up sufficient tension and resistance to prevent the device from moving or vibrating toward the right, that is, out of engagement with the bolt after the said device has been driven across the face of the nut to establish a locking engagement thereof with the bolt threads. At diametrically opposite points and in alinement with the long diameter of the elliptical opening 2, the plate 1 is formed with impacting projections 7 and 8, the plane of the long diameter of the elliptical opening 2 centrally intersecting the said impacting projections. On opposite sides of the impacting projection 7 are brace flanges 9 having right-angular terminals 10 to contact with the outer face of the nut when the device is moved or shifted into locking position, as will be more fully hereinafter explained. These brace flanges, when the plate is driven from left to right or out of engagement with the bolt, slip down over the adjacent side faces of the nut and prevent the plate from moving to the left into engagement with the bolt or resist the tendency of the tongues 6 to so move the plate to the left, during the operation of unscrewing the nut from the bolt. Hence, the nut may be unscrewed without removing the device from the nut by simply pressing the plate through the medium of the impacting projection 8 to the right and permitting the right-angular terminals 10 of the braces 9 to serve their function. From the foregoing it will be seen that the spring tongues 6 exert a continual tension on the plate 1 toward the left or so as to bring the locking teeth 3 and tongue 4 into locking engagement with the threads of the bolt and that this tension is overcome by shifting the plate 1 toward the right, the plate being restrained in responding to the tendency of the tongues 6 to draw the same toward the left by the right-angular terminals 10 of the brace flanges engaging the adjacent side faces of the nut. The bolt $10^a$ is of any suitable form and provided with threads $10^b$ which are not in the least subjected to preliminary mutilation for the purpose of applying the lock device. The threads $10^b$ are engaged by a nut 11 which is of usual form and may have its outer face 12 either beveled, as shown by Fig. 3, or straight, as shown by Fig. 4, and if the outer face of the nut is beveled it is cut off at an angle corresponding to the pitch or angle of the bolt threads $10^b$ to render the lock device more effective in securing the nut against accidental removal.

In applying the lock device as thus far described, it is slipped over the outer end or nose of the bolt $10^a$ and applied to the outer face of the nut 11 with the flanges 5 embracing two sides of the nut, and the spring tongues 6 bearing on adjacent nut sides between those engaged by the flanges. In applying the lock device over the bolt end or nose, the enlarged portion of the opening 2, or as shown by Fig. 1 that part of said opening which is to the left of the vertical short diameter, is positioned over the bolt end or nose, and when the washer is fully pressed up against the outer face of the nut it will have the same angular position as said face if the latter be beveled and as shown by Fig. 3, so that the teeth 3 may accurately strike and engage between adjacent threads $10^b$, and so that the tongue 4 may correspondingly take into the groove between threads with which it will coöperate. After the lock device has thus been applied, the impacting projection 7 is given a sharp blow or tap with a wrench or other device, and the device is thus driven across the face of the nut against the resistance of the spring tongue 4, which has a rounded free extremity to facilitate penetration thereof between the threads with which it engages, and as the device is shifted from right to left the teeth 3 cut into or automatically seat themselves within the groove of adjacent threads $10^b$ and lock the device against accidental movement and also simultaneously secure the nut 11 on the bolt. The movement of the device across the face of the nut continues until the series of teeth 3 are well driven into the bolt threads, or in the groove between threads, and the brace flanges 9 also moving over the face of the nut set up an outward pull on the device to render the teeth 3 and tongue 4 more effective in retaining the device as a whole against accidental movement or displacement from a locking position. It will be inferred that the teeth will be retained in engaging position to a large extent by the resisting opposition of the tongue 4, the latter yielding in an outward direction or transversely with respect to its length and also inward and outward in relation to the plane of the device. A further means causing the teeth to firmly engage between threads of the bolt is the differentiation in length of the said teeth, and the plurality of points of the teeth and the position of the said teeth in a plane at right angles to the bolt will insure a firm and reliable locking engagement of the teeth and device with the bolt in the manner specified. A still further structural arrangement conducive to setting up an effective locking action between the device and the bolt is the formation of a portion of the opening 2 or that at the left, as shown by Fig. 1, of greater diameter than the bolt and the opposite portion of said opening is of less diameter than the bolt when measured between the teeth 3 and the tongue 4. This latter construction facilitates the application of the device 2 and its removal from the nut without turning the latter, so that the device may be applied to the said nut after the bolt and nut have been tightened up or the nut turned fully home on the bolt, or the said plate by this means may be removed from the nut prior to separation of the bolt and nut or loosening of the said nut. It will be understood also that the device may be applied to the nut and turned with the latter, either of the immediately foregoing operations and conditions depending upon the choice of the user and as circumstances may demand.

The spring tongues 6 bearing against the faces of the nut which they engage maintain the device in a position of security and set up a counteracting resistance to movement of the device in the direction which would loosen or disengage the teeth 3 and tongue 4 from the bolt threads, and the flanges 5 and tongues 6 also prevent the device from falling off the nut when the teeth 3 and locking tongue 4 are not in engaging positions between the bolt threads or prior to shifting of the plate or device over the face of the nut into locking position. It will also be noted that the brace flanges 9 are bent into rounding angles, as at 13, so as to render the same strong and resist breakage in view of the strain to which they are subjected, and the flanges 5 are bent at true right angles to exactly fit the side faces of the nut with which they engage and prevent side play of the device. The flanges 5 and 9 as well as the tongues 6 may be of any suitable length and each modified with respect to the other in accordance with the operation sought. In disengaging the device from the bolt threads the impacting projection 8 is given a sharp blow, thus shifting the washer to the right over the face of the nut and releasing the teeth 3 and tongue 4 from the bolt threads and the brace flanges from the face of the nut, the latter flanges, as soon as the sides of the nut are reached nearest thereto, dropping over said sides and maintaining the device in a position to hold the teeth 3 out of engagement with the bolt threads and likewise disengage the tongue 4 from the threads against the resistance of the spring tongues 6, and during such position of the device the nut may be unscrewed with the device thereon. The device may be entirely removed from the nut by pushing the same far enough to the right until the enlarged portion of the opening registers with the bolt end or nose when the device may be easily slipped off over the nose of the bolt without removing the nut from the latter.

In the form of the nut and device shown by Fig. 4, the outer face of the nut is straight or does not have the bevel as shown by Fig. 3. The device in this instance is placed flat or squarely against the outer face of the nut and when shifted the braces 9 engaging the face of the nut dispose the plate or device at an angle to the said face and not only hold the device in locked position against the resistance of the spring tongues 6, but also dispose the teeth 3 and tongue 4 at an angular position relatively to the threads $10^b$ of the bolt practically in the same manner as when the device is used with a nut having an outer beveled face. In either instance, therefore, it will be observed that the device or plate will be held at an angle to insure locking engagement of the teeth 3 and tongue 4 with the bolt threads.

In the form of the device shown by Fig. 5, the nut 14 has its outer face 15 formed with a groove 16, the latter being constructed as a seat recess and intersected by a groove 17 centrally extending over one side of the nut and provided with locking lugs 18 terminally projecting inwardly near the rear face of the nut. These lugs 17 may be formed before the locking device is applied or after the latter has been placed in operative position by striking the metal at portions of the opposite walls of the groove 17 inwardly by means of a suitable tool. The locking washer 19 in this instance also consists of a flat plate having a central opening 20 of approximately elliptical form into which a plurality of teeth 21 projects, the said teeth differing in length and increasing in dimensions as in the construction shown by Figs. 1 and 2. The teeth 21 extend into the opening 20 directly opposite an upper longitudinally straight wall 22 which is normally above the highest portion of the screw-threaded bolt opening 23 extending through the nut. The upper and lower straight edges 24 and 25 of the device 19 engage correspondingly straight walls of the groove or seat recess 16, the said groove or recess being of the same depth as the thickness of the plate forming the body of the device to permit the outer face of the said plate to lie flush with the portions of the outer face of the nut standing outwardly beyond the floor of the groove or recess 16. The lock device, as shown by Fig. 5, also has an impacting projection or angular edge 26 at the center of one end which operates as a brace flange means when the device is shifted to the left into locking position and also as a retaining means to engage one side edge of the nut in a manner similar to the function performed by the brace flanges 9, hereinbefore described. The lock device 19 also has a spring tongue 27 diametrically opposite the flanged impacting projection or edge 26, the tongue 27 being of the same form and angular disposition as the tongues 6 hereinbefore described and operating similarly to the latter tongues.

In applying the form of lock device shown by Fig. 5, the tongue 27 is fitted in the groove 17, either under the retaining lugs or projections 18, which serve to hold the device in place on the nut, or said retaining lugs or projections may be struck inwardly over the rear extremity of the said tongue 27 after the latter has been disposed in the groove 17. When the device is applied to the nut before the latter is screwed on the bolt, the lugs 18 are struck inwardly over the tongue 27 either at the factory or by the purchaser. When the device is applied after the nut is fitted on the bolt the lugs 18 are struck inwardly or produced after the nut and device are in place. In either form of application of the device, however, the locking operation is the same as in the form of the device disclosed by Figs. 1, 2, 3 and 4. The distance between the maximum projection of the teeth 21 and the wall 22 is approximately equal to the diameter of the bolt opening 23 so that the washer may be readily applied over the end of the bolt with the nut or independently of the nut. The device 19 is locked to the bolt by hitting the impacting edge or projection 26 with a wrench or other analogous device and driving the teeth 21 between the threads of the bolt or causing said teeth to cut into a groove between the threads of the bolt, and in releasing this form of device a blow with a suitable device is delivered thereto at a point opposite the projection 26 which will loosen the teeth 21. The spring tongue 27 shifts or moves in its groove 17 in accordance with the opposite movements of the device as a whole and sets up a counteracting resistance to release of the teeth 21 by vibrations from the threads of the bolt. This form of device is preferably applicable to hexagonal or octagonal nuts.

The further modification of the locking device, as shown by Figs. 6 and 7, embodies the same principle of operation as the preceding forms or contemplates the use of a device such as a plate or strip movable or shiftable across the face of the nut and having locking teeth engaging the threads of the bolt and also provided with a yielding retention tongue. The nut 26ª, shown by Figs. 6 and 7, has its outer face beveled off at an angle as at 27ª and is provided with a threaded bolt opening 28 and a groove 29 extending entirely across the face of the nut below the bolt opening and coinciding with a groove 30 also extending across one side of the nut and having inwardly projecting retaining lugs 31 which may be formed before the locking device is applied to the nut or after such device is applied. Coöperating with the grooves 29 and 30 as just explained, is a locking device 32 consisting of a metal strip having a plurality of teeth 33 projecting from the upper edge thereof and corresponding to the teeth 3 and 23 shown by Figs. 1, 2 and 5, and adjacent to the said teeth 33 a clearance cavity 34 is formed to permit the application of the locking device or strip to the nut without jamming against the bolt extremity prior to locking shifting movement of the strip to cause the teeth 33 to engage the bolt threads. A spring tongue 35, similar to the tongue 27 shown by Fig. 5 and the tongues 6 illustrated by Figs. 1 and 2, is formed continuous with one extremity of the locking device or strip 32 and is fitted in the groove 30 and held by the projections 31, the said tongue 35 being free to shift in its groove and also to exert its resilient function. At the extremity of the locking device or strip 32 opposite that provided with the tongue 35, an angular brace flange 36 is formed and adapted to move over and contact with the floor of the groove 29 to spring the locking device or strip 32 outwardly and serve the same function as the bracing flanges heretofore described. The tongue 35 in this modified form of the invention operates similarly to the tongue 27 shown by Fig. 5 and the tongues 6 illustrated by Figs. 1 and 2 when the teeth 33 are driven into the groove between threads of the bolt, or opposes the release of the said teeth from the bolt threads. When it is desired to release the teeth 33 from the bolt threads, the locking device or strip 32 is shifted toward the right over the face of the nut or within the groove 29 by delivering a blow with some suitable device to the portion of said locking strip or device adjacent to the tongue 35.

It is intended to make the face of the nut shown by Figs. 5 and 6 either straight or beveled and likewise the floors of the grooves or seat recesses 16 and 29 may be either straight or beveled, or when the faces of the nuts are straight the floor grooves may be beveled so as to position the locking devices, strips or plates to the best advantage with respect to the bolt threads, it being intended to be understood by the showing of the nut illustrated by Figs. 6 and 7 that the nut illustrated by Fig. 5 may be similarly constructed. The form of the locking device illustrated by Figs. 6 and 7 is preferably applicable to a square nut. Furthermore, the spring tongues 6, 27 and 35 materially assist in removing the washer or locking device, as it is only necessary after shifting the locking device to unlocking position to press inwardly on the spring tongues with such force as to cause an absolute clearance of the teeth from the bolt threads subsequent to the release of said teeth or until the left end walls of the openings 2 and 20 in the locking devices shown by Figs. 1 and 5 and the left wall of the cavity 34, Fig. 6, touch the bolt threads. The locking device as shown will also be prevented from rising or moving upwardly over the face of the nut and will always be maintained in proper working position. The locking device also becomes a part of the nut, and in all instances is so applied to the nut as to be most efficient in forming a locking means through the medium of the teeth extending toward the bolt threads in a plane at right angles to the longitudinal extent of the bolt, and, furthermore, the teeth do not become operative by bending a portion of the locking device, but are always in position for accurate engagement with the bolt threads.

It will be obvious that when the locking device is shifted into locking engagement with the threads of the bolt, any tendency of the nut to start to unscrew will be prevented by the teeth in engagement with the threads of the bolt, and such tendency would only result in causing a more positive bite or drawing inward of the teeth between the bolt threads. Structurally, the locking device embodying the features of the present invention is economical in manufacture in that it is made up from a single piece of material and capable of being completely formed at one operation. Another advantage is that the locking device as a whole is exteriorly exposed and readily accessible for manipulation. The coöperating parts of the locking device are assisted in performing their functions by the inclined or outer beveled face of the nut when the said beveled construction is used, or when the locking device is disposed at an angle in the manner hereinbefore explained, and in addition to this particular common feature it will be noted that the locking device in all its forms is possessed of teeth and spring tongue retention means.

The different forms of nuts shown in the drawings indicate that it is intended to use the locking device with any type of nut adapted to have the features of the invention applied thereto.

Having thus fully described the invention, what is claimed as new, is:

1. The combination of a nut having a bolt opening, and a locking device shiftable in opposite directions over the outer face of the nut and having bolt penetrating teeth projecting from one edge and spring-retention and angular brace means at opposite portions.

2. The combination of a nut having a bolt opening, and a locking device shiftable over the outer face of the nut and provided with bolt penetrating teeth projecting inwardly from one edge and permanent angular spring-retaining and centrally disposed impacting means at opposite portions.

3. The combination of a nut having a bolt opening, and a locking device shiftable over the outer face of the nut and provided with bolt penetrating teeth projecting inwardly from one edge and permanent angularly disposed spring-retaining means, the device also having centrally disposed impacting means at opposite extremities.

4. The combination of a nut having a bolt opening, and an outer beveled face, and a locking device applied against the nut face and shiftable in opposite directions thereover and provided with means to engage the threads of a bolt and also with terminal resilient and brace means to respectively engage the sides and a portion of the face of the nut.

5. The combination of a nut having a bolt opening therethrough and an outer beveled face, and a locking device held in close engagement with and shiftable over the outer beveled face of the nut and provided with spring holding and retention means at opposite extremities, the retention means being movable over a portion of the nut face.

6. The combination of a nut having a bolt opening and an outer beveled face, a bolt having a threaded extremity on which the nut is fitted, the outer beveled face of the nut having the same angle as the pitch of the threads of the bolt, and a locking device shiftably applied to and held against the outer beveled face of the nut and having teeth gradually increasing in inward extent to engage the threads of the bolt, the locking device being sprung outwardly when in locking position.

7. A nut locking means comprising a bolt, a nut, and a locking device shiftable in opposite directions on the outer face of the nut and disposed at the same angle as the pitch of the threads of the bolt and provided with teeth projecting inwardly from one edge and gradually increasing in inward extent from the innermost shortest to the outermost longest tooth to engage the bolt threads and lock the nut against movement, the locking device being sprung outwardly at an angle with respect to the nut face when in locking position.

8. A nut lock comprising a bolt having a threaded extremity, a nut fitted on said threaded extremity, and a locking device held against and slidable over the outer face of the nut and disposed at the same angle as the pitch of the threads of the bolt and provided with teeth projecting inwardly from one edge and increasing in inward extent gradually from the innermost to the outermost tooth to engage the bolt threads, and means coöperating with opposite extremities of the device for preventing accidental disengagement of the teeth from the threads.

9. A nut lock comprising a bolt having a threaded extremity, a nut engaging the said extremity, and a locking device applied against the outer face of the nut and disposed at the same angle as the pitch of the threads of the bolt, the locking device having teeth to bite into the threads of the bolt and opposing retaining means to prevent accidental disengagement of the teeth from the threads, a part of the said means operating to force the locking device outwardly with relation to the face of the nut.

10. A nut lock comprising a bolt having a threaded extremity, a nut engaging said extremity, and a locking device movable over the outer face of the nut in opposite directions and held at the same angle as the pitch of the threads of the bolt, the locking device being provided with teeth to engage the threads of the bolt and a spring tongue means at one extremity operating to retain the teeth in engagement with the bolt threads.

11. A nut lock comprising a bolt with a threaded extremity, a nut engaging said extremity, and a locking device movable in opposite directions over the outer face of the nut and held at the same angle as the pitch of the threads of the bolt and adapted to be drawn outwardly in relation to the face of the nut, the locking device being provided with teeth to engage the bolt threads and an impacting projection by means of which the plate is moved across the face of the nut.

12. A nut lock comprising a bolt having a threaded extremity, a nut on the said extremity, and a locking device movable over the outer face of the nut and held at an angle corresponding to the pitch of the threads of the bolt, the locking device being provided with spring and impacting means to respectively operate to retain the teeth in engagement with the bolt threads and to serve to receive a blow for forcefully moving the device over the face of the nut.

13. A nut lock comprising a bolt having a threaded extremity, a nut engaging said extremity, and a locking device movable over the outer face of the nut and held at an angle corresponding to the pitch of the threads of the bolt, the locking device being provided with teeth to engage the threads of the bolt and spring tongue means at an angle to one extremity and in part bent outwardly, the spring tongue means operating to retain the teeth in engagement with the bolt threads.

14. A nut lock comprising a bolt having a threaded extremity, a nut engaging said extremity, and a locking device having an opening therein to loosely receive the bolt extremity and movable over the outer face of the nut in opposite directions and provided with inwardly extending angularly disposed teeth to engage the threads of the bolt, the locking device having at one extremity a brace flange means also movable over a portion of the face of the nut when the device is shifted over the face of the nut and operating to throw the device at an angle outwardly with relation to the nut face to exert a lateral pulling strain on the teeth and prevent accidental disengagement of the latter from the bolt threads.

15. A nut lock comprising a bolt having a threaded extremity, a nut engaging said extremity, and a locking device movable over the outer face of the nut in opposite directions and held at an angle corresponding to the pitch of the threads of the bolt, the locking device being provided with teeth to engage the threads of the bolt and a brace flange means to draw the said device outwardly with relation to the adjacent face of the nut.

16. A nut lock comprising a bolt having a threaded extremity, a nut engaging said extremity, and a locking device movable over the outer face of the nut in opposite directions and provided with teeth to engage the threads of the bolt and also with spring tongue means at one extremity and brace flange means at the opposite extremity, the brace flange means operating to draw the locking device outwardly in relation to the adjacent face of the nut.

17. A nut lock comprising a bolt having a threaded extremity, and a locking device having an elongated opening in the intermediate portion of the body thereof and removably applicable to the outer face of the nut over the threaded extremity of the bolt, the said device being provided with inwardly projecting teeth at one wall of the opening and a tongue at the opposite wall to engage opposite portions of the threaded extremity of the bolt, the locking device being shiftable in opposite directions over the face of the nut to engage and disengage the teeth and tongue with relation to the bolt threads and also adapted to be disposed at an angle to the face of the nut.

18. A nut lock comprising a bolt having a threaded extremity, a nut engaging said extremity, and a locking device movably fitted over the outer face of the nut and shiftable in opposite directions, the device having an elongated opening with inwardly projecting teeth and a tongue at opposite portions of the wall of said opening, the device being also provided with retaining flanges to embrace opposite sides of the nut.

19. A nut lock comprising a bolt having a threaded extremity, a nut engaging said extremity, and a locking device removably applied to and shiftable in opposite directions over the outer face of the nut, the device having an opening therein with teeth and a tongue projecting from opposite walls of said opening into the latter and also provided with embracing flanges and spring tongues which are angularly bent to engage the sides of the nut.

20. A nut lock comprising a bolt having a threaded extremity, a nut engaging said extremity, and a locking device removably applied to and shiftable in opposite directions over the outer face of the nut, the device having an opening therein with teeth and a tongue projecting from opposite walls of said opening into the latter and also provided with embracing flanges and spring tongues which are angularly bent to engage the sides of the nut, impacting projections being also provided at opposite extremities of the device.

21. As an improved article of manufacture, a locking device for a nut having an elongated central opening with teeth and a tongue projecting into said opening from opposite walls of the latter, the teeth projecting at an angle to the tongue and the said tongue extending longitudinally into the opening and edge retaining means to hold the device in applied position.

22. As an improved article of manufacture, a locking device for removable application to a nut, consisting of a resilient plate having a central elongated opening in the body thereof larger at one extremity than the other and provided with completely closed walls to removably fit over a bolt extremity, teeth projecting inwardly into said opening from one side wall of the latter between the opposite extremities of the opening and disposed at an angle to said wall.

23. As an improved article of manufacture, a locking device for removable engagement with a nut having a central elongated opening with teeth and a spring locking tongue projecting inwardly into the opening from opposite portions of the wall of the latter and within the same plane as the face of the device and movable in opposite directions over the face of the nut to which it is adapted to be applied.

24. As an improved article of manufacture, a locking device for removable application to a nut having an elongated opening therein contracted adjacent to one extremity by bolt thread engaging means in part yieldable and movable in opposite directions in a plane at right angles to the locking device.

25. As an improved article of manufacture, a locking device for removable application to a nut having a central elongated opening therein in part contracted by bolt thread engaging means, the opposite extremities of the device being respectively provided with spring tongues and brace flanges, and also having nut embracing flanges between the tongue and brace flanges.

26. As an improved article of manufacture, a locking device for removable engagement with a nut having teeth projecting inwardly therefrom to bite into bolt threads and angular spring retention tongue and angular brace means at opposite extremities, the locking device being held at an angle with respect to the face of the nut to which it is applied by the brace means.

27. As an improved article of manufacture, a locking device for removable engagement with a nut provided with inwardly projecting teeth and angular spring retention means at one end and bracing flange means at the opposite end, the bracing flange means being movable with the device to engage different portions of the nut.

In testimony whereof I have hereunto set my hand in presence of two subscribing witnesses.

DONALD H. MILLER.

Witnesses:
   ALFONSE FRANK SPIEGEL,
   JAMES F. BARBER.